United States Patent [19]
Nishiki et al.

[11] Patent Number: 5,798,812
[45] Date of Patent: Aug. 25, 1998

[54] ACTIVE MATRIX SUBSTRATE AND DISPLAY DEVICE USING THE SAME WITH EXTENDING PROTRUSIONS BETWEEN GATE AND SOURCE LINE TERMINALS

[75] Inventors: Hirohiko Nishiki, Tenri; Takayuki Shimada, Yamatokoriyama; Mikio Katayama, Ikoma, all of Japan

[73] Assignee: Sharp Kabushiki Kaisha, Osaka, Japan

[21] Appl. No.: 723,956

[22] Filed: Sep. 26, 1996

[30] Foreign Application Priority Data

Sep. 28, 1995 [JP] Japan .................. 7-251385

[51] Int. Cl.$^6$ .................. G02F 1/1345; G02F 1/136
[52] U.S. Cl. .................. 349/152; 349/43; 349/151
[58] Field of Search .................. 349/43, 47, 151, 349/152

[56] References Cited

U.S. PATENT DOCUMENTS

| | | | |
|---|---|---|---|
| 4,718,751 | 1/1988 | Kamijo et al. | 349/152 |
| 4,759,610 | 7/1988 | Yanagisawa | 350/334 |
| 4,857,907 | 8/1989 | Koden | 340/784 |
| 4,923,948 | 5/1990 | Matsuki et al. | 528/26 |
| 5,032,883 | 7/1991 | Wakai et al. | 257/59 |
| 5,166,085 | 11/1992 | Wakai et al. | 437/40 |
| 5,200,847 | 4/1993 | Mawatari et al. | 349/151 |
| 5,250,931 | 10/1993 | Misawa et al. | 349/151 |
| 5,585,951 | 12/1996 | Noda et al. | |
| 5,641,974 | 6/1997 | den Boer et al. | 257/59 |
| 5,706,064 | 1/1998 | Fukunaga et al. | 349/43 |

FOREIGN PATENT DOCUMENTS

| | | |
|---|---|---|
| 0611812 | 8/1994 | European Pat. Off. . |
| 0632229 | 1/1995 | European Pat. Off. . |
| 1-35351 | 7/1989 | Japan . |
| 442214 | 2/1992 | Japan . |
| 4-74714 | 11/1992 | Japan . |
| 5-88199 | 4/1993 | Japan . |
| 6-186580 | 7/1994 | Japan . |
| 6-230422 | 8/1994 | Japan . |

OTHER PUBLICATIONS

M. Sakamoto et al., *SID 96 Digest*, pp. 681–684, 1996, "27.3: A High–Aperture–Ratio 3–in.–Diagonal VGA a–Si Light Valve with Pixel/Data and Pixel/Gate Lines Overlapping".

S. S. Kim et al., *SID 95 Digest*, pp. 15–18, 1995 "4:3: High–Aperture and Fault–Tolerant Pixel Structure for TFT–LCDs".

K. Fujita et al., *NITTO GIHO*, vol. 29, No. 1, pp. 20–28, 1991, "Colorless Polyimide" with partial English translation.

*Primary Examiner*—Anita Pellman Gross

[57] ABSTRACT

An active matrix substrate of the present invention, includes a substrate; a plurality of switching elements and a plurality of pixel electrodes formed in a matrix on the substrate; scanning lines for supplying a scanning signal and for controlling the plurality of switching elements; signal lines for supplying a data signal to the plurality of switching elements formed so as to cross each other; a terminal electrically connected to either each scanning line or each signal line, the terminal being connected to an external terminal. An organic film is formed between adjacent terminals.

14 Claims, 6 Drawing Sheets

ACTIVE MATRIX SUBSTRATE AND DISPLAY DEVICE USING THE SAME WITH EXTENDING PROTRUSIONS BETWEEN GATE AND SOURCE LINE TERMINALS

BACKGROUND OF THE INVENTION

1. Field of the Invention

The present invention relates to an active matrix substrate including switching elements such as TFTs (Thin Film Transistors) and MIM (Metal Insulator Metal) elements, and more particularly relates to a display device incorporating the same.

2. Description of the Related Art

Display devices are known which include a display medium such as a liquid crystal material, an electrochromic material, an electroluminescent material and a plasma, the display medium being interposed between a pair of substrates. As one of the pair of substrates of such display devices, so-called active matrix substrates are known in which switch elements and pixel electrodes are disposed in a matrix on a display region, along with a plurality of scanning lines (i.e., gate lines) and a plurality of signal lines (i.e., source lines) crossing each other. The switching elements such as TFTs or MIM elements, which drive the pixel electrodes, are formed of a semiconductor such as amorphous silicon and polycrystalline silicon.

Conventionally, inorganic materials such as SiN are used as an insulating film for the above active matrix substrate. Recently, it has been proposed to use organic materials in an insulating film (Japanese Patent Application Nos. 7-206367 and 7-254043, which are assigned to the same assignee as the present application). Such an insulating film of organic materials may be formed, for example, by applying a solution containing an organic material by spin-coating etc., and thereafter curing with heat or the like.

In the case where the organic material is a positive-type photosensitive resin, the organic material is irradiated with light such as ultraviolet light so that portions exposed to light become soluble in an alkaline aqueous solution. For example, a photosensitive acrylic resin including a copolymer having methacrylic acid and glycidyl methacrylate, mixed with a positive-type photosensitive agent (e.g., quinonediazide) may be used as the resin. After applying the solution containing the acrylic resin material on a substrate by spin-coating, the material can be patterned through a process similar to the usual photopatterning process (i.e., pre-baking, patterned exposure, alkaline development and washing with demineralized water, and exposure of the entire substrate to light, whereby the resin is decolored (transparentized)). Thus, the use of a photosensitive organic material provides the advantage of patterning the film and forming the film at the game time. Such an organic insulating film is used as an interlayer insulating film for a liquid crystal display device having a high aperture ratio. The thickness of the interlayer insulating film preferably is larger than about 1.5 μm.

FIG. 5A is a plan view showing an active matrix substrate having the above-described interlayer insulating film. FIG. 5B is a cross-sectional view taken along line VB—VB in FIG. 5A. This active matrix substrate includes an in organic insulating film 17 formed on a substrate 11; TFTs 3, connecting electrodes 4 and pixel electrodes 6 (within a solid line) formed on the insulating film 17 in a matrix; and gate lines 1 and source lines 2 being formed so as to intersect each other. Each of the TFTs 3 includes an amorphous silicon semiconductor layer. An interlayer insulating film 16 formed of the above-described organic material is formed over the gate lines 1, the source lines 2, TFTs 3 and the connecting electrodes 4. On the organic interlayer insulating film 16, pixel electrodes 6 are provided. Each connecting electrode 4 and each pixel electrode 6 are electrically interconnected via a contact hole 5 provided in the interlayer insulating film 16. Since the organic interlayer insulating film 16 allows the periphery of the pixel electrode 6 to overlap the gate line 1 and/or the source line 2, etc., the aperture ratio of the active matrix substrate (i.e., the liquid crystal display device) is improved.

In addition, the above-described active matrix substrate includes in the periphery of the display region terminals for connecting the various lines with an external circuit board.

FIG. 6 is a plan view showing an active matrix having a high aperture ratio structure. This active matrix substrate includes a substrate 11 having the above-described inorganic insulating film formed thereon; gate lines 1 and source lines 2 formed above the substrate 11 so as to intersect each other; broadened portions 1a for gate line terminals 8 integrally formed and electrically connected to the respective gate lines 1; and broadened portions 2a for source line terminals 9 integrally formed and electrically connected to the respective source lines 2.

An organic interlayer insulating film 7a (corresponding to the interlayer insulating film 16 in FIG. 5B) is formed to cover all of the gate lines 1 and source lines 2 and a portion of each broadened portion 1a and 2a. The interlayer insulating film 7a should overlap a portion of each broadened portion 1a and 2a in order to provide a sealing portion 34 (formed of a sealant) for attaching a counter substrate thereto in the outer periphery of the display region. A mounting region 35 around the sealing portion 34 defines a region where gate line terminals 8 and source line terminals 9 are formed so as to be substantially electrically connected to external terminals (not shown).

However, since the organic film is not formed on the mounting region 35, the above-described active matrix substrate has the following problem.

Transparent conductive films formed of materials such as ITO (Indium Tin Oxide) are used as the above-mentioned pixel electrodes. Specifically, an ITO film is formed on the entire surface of the substrate and patterned to form these pixel electrodes. However, the ITO film is formed partially on an organic film and partially on an inorganic film, whereby the ITO crystals are grown at different rates on each of the underlying films. As a result, the etching rates of the ITO film depends on whether the ITO film is grown on the organic film or on the inorganic film. For instance, an ITO film on the organic film can have an etching rate approximately 8 times as fast as that of an ITO film on the inorganic film. Accordingly, in terms of precision in patterning the pixel electrodes, the etching time must be calculated based on the etching time required for the display region, where the ITO film is formed on the organic interlayer insulating thin film 7a. Thus, an unetched ITO film 15 tends to inevitably remain between adjacent terminals 8 and between adjacent terminals 9 in the mounting region 35, where the ITO film 12 is formed on the inorganic insulating film 17 (since the interlayer insulating film 7a is not formed).

The above problem will be further described below with reference to FIGS. 7A to 7D.

As shown in FIG. 7A, the inorganic insulating film 17 is formed on the substrate 11, and source line terminals 9 are provided on the insulating film 17 at predetermined intervals.

Then an ITO film 6a to become the above-mentioned pixel electrodes 6 is formed on the entire surface of the substrate 11 (FIG. 7B).

Subsequently, a photoresist 14 is formed on the source line terminal 9 as shown in FIG. 7C, and the conductive ITO film 6a between the source line terminals 9 is etched away.

FIG. 7D shows the result of the above processes. More specifically, the ITO film on the organic interlayer insulating film is entirely removed by etching, while the ITO film 6a on the inorganic insulating film 17 remains incompletely etched due to the above-mentioned difference in etching rates. As a result, the remaining ITO film 15 causes leakage between the source line terminals 9. The same problem can occur between adjacent gate line terminals 8.

In order to reduce the above-mentioned leakage, a manufacturing method is required which includes a first etching for an etching time required for the ITO film on the organic film (which has a faster etching rate), shielding the ITO film on the organic film with a resist or the like, and a second etching for an etching time required for the ITO film 12 on the inorganic film. In this method, the process steps of photoresist formation and etching are performed twice each, thereby complicating the manufacturing process.

SUMMARY OF THE INVENTION

In accordance with one aspect of the present invention, an active matrix substrate includes a substrate; a plurality of switching elements and a plurality of pixel electrodes formed in a matrix on the substrate; scanning lines for supplying a scanning signal and for controlling the plurality of switching elements; signal lines for supplying a data signal to the plurality of switching elements formed so as to cross each other; a terminal electrically connected to either each scanning line or each signal line, the terminal being connected to an external terminal. An organic film is formed between adjacent terminals.

In one embodiment of the present invention, an interlayer insulating film is used as the organic film, the interlayer insulating film being formed so as to cover the scanning lines, the signal lines and the switching elements.

In another embodiment of the present invention, the plurality of pixel electrodes are formed on the interlayer insulating film and are connected to the respective switching elements via contact holes formed in the interlayer insulating layer.

In still another embodiment of the present invention, a thickness of the organic film formed between adjacent terminals is larger than that of the terminals.

In yet still another embodiment of the present invention, the organic film is formed of a positive-type photosensitive resin.

In another embodiment of the present invention, a display device uses an active matrix substrate as one of a pair of substrates interposing a display medium therebetween.

According to the present invention, an organic film pattern is additionally formed between adjacent terminals to be connected to external terminals (i.e., in a mounting region). The additional organic film pattern provides an advantage in that in an application where an organic film is provided under a pixel electrode (i.e., in a display region), both of the ITO films (provided on the display region and the mounting region) are etched away substantially simultaneously. As a result, no ITO film remains unetched between the terminals. Thus, disadvantageous leakage between terminals can be prevented without complicating the manufacturing process.

Moreover, the etching rate of the ITO film according to the present invention is fast because the ITO film is formed on organic films.

Thus, the invention described herein makes possible the advantages of: (1) providing an active matrix substrate capable of preventing leakage between terminals connected to an external substrate without complicating the manufacturing process; and (2) providing a display device incorporating the active matrix substrate.

These and other advantages of the present invention will become apparent to those skilled in the art upon reading and understanding the following detailed description with reference to the accompanying figures.

DESCRIPTION OF THE PREFERRED EMBODIMENTS

Figure 1:
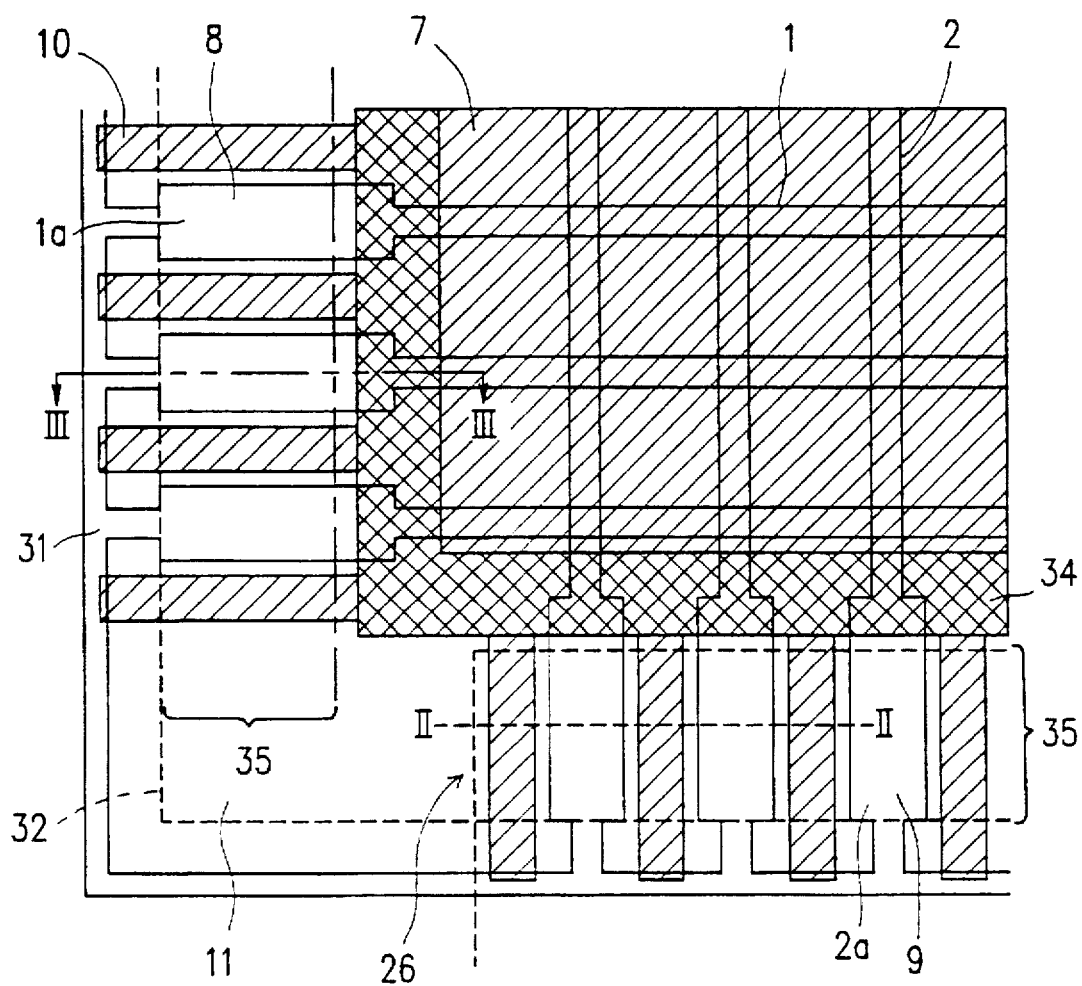
FIG. 1 is a plan view showing an example of an active matrix substrate according to the present invention.

Hereinafter, the present invention will be described by way of an illustrative example with reference to the accompanying drawings in which the same reference numerals are used for like parts of the active matrix substrate having the same functions.

FIG. 1 is a plan view showing an example of an active matrix substrate according to the present invention. This active matrix substrate has a high aperture ratio structure with each pixel portion formed in the manner shown in FIG. 5A. More specifically, gate lines 1 (as scanning lines) and source lines 2 (as signal lines) are formed so as to intersect each other; broadened portions 1a for gate line terminals 8 are integrally electrically connected to the respective gate line 1; and broadened portions 2a for source line terminals 9 are integrally electrically connected to the source line 2.

Figure 5A:
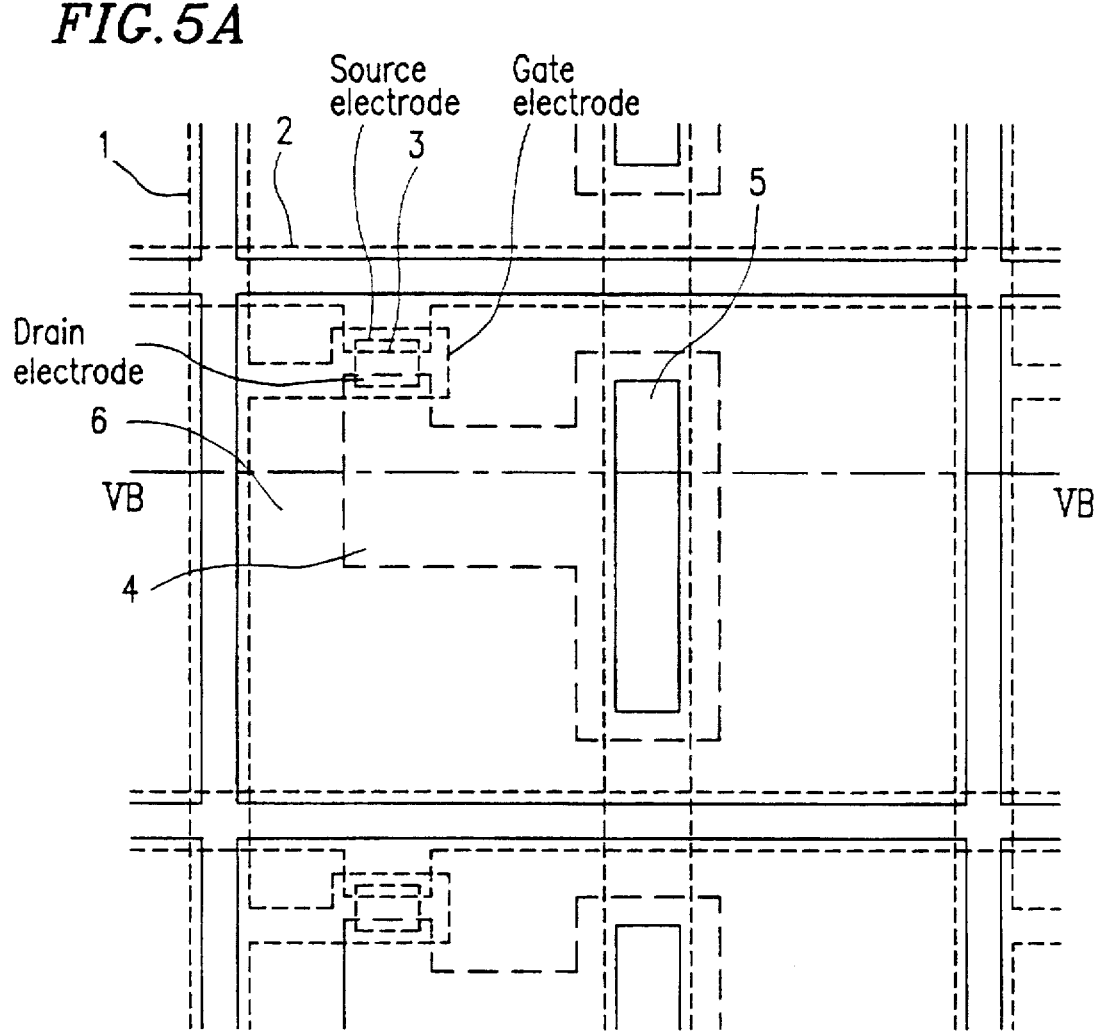
FIG. 5A is a plan view showing a display region of an active matrix having a high aperture ratio.

In the vicinity of an intersection of each gate line 1 and each source line 2, a TFT 3 acting as a switching element is formed as shown in FIG. 5A. The TFT 3 has an inverted staggered structure in which a semiconductor layer is disposed above a gate electrode with an gate insulating film interposed therebetween, and a source electrode and a drain electrode are disposed on the semiconductor so as to be electrically disconnected from each other. The gate electrode of each TFT is connected to a corresponding gate line 1, through which signals are inputted for driving the TFT. Moreover, the source electrode of each TFT is connected to a corresponding source line 2, through which data signals are inputted.

Figure 5B:
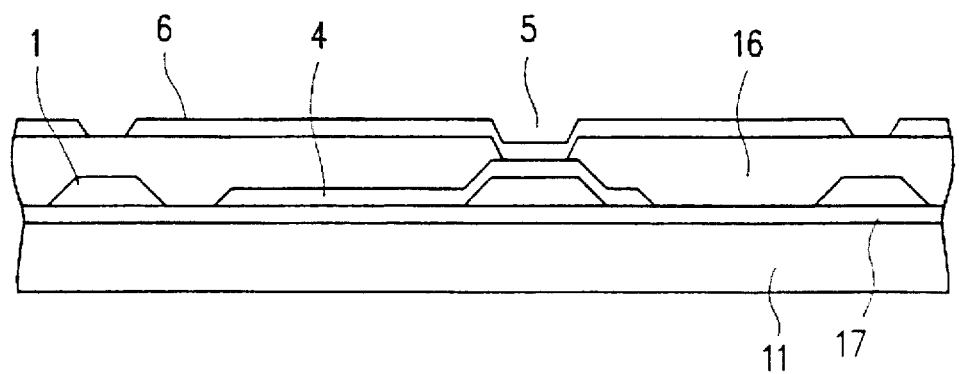
FIG. 5B is a cross-sectional view taken along line VB—VB in FIG. 5A.
Figure 6:
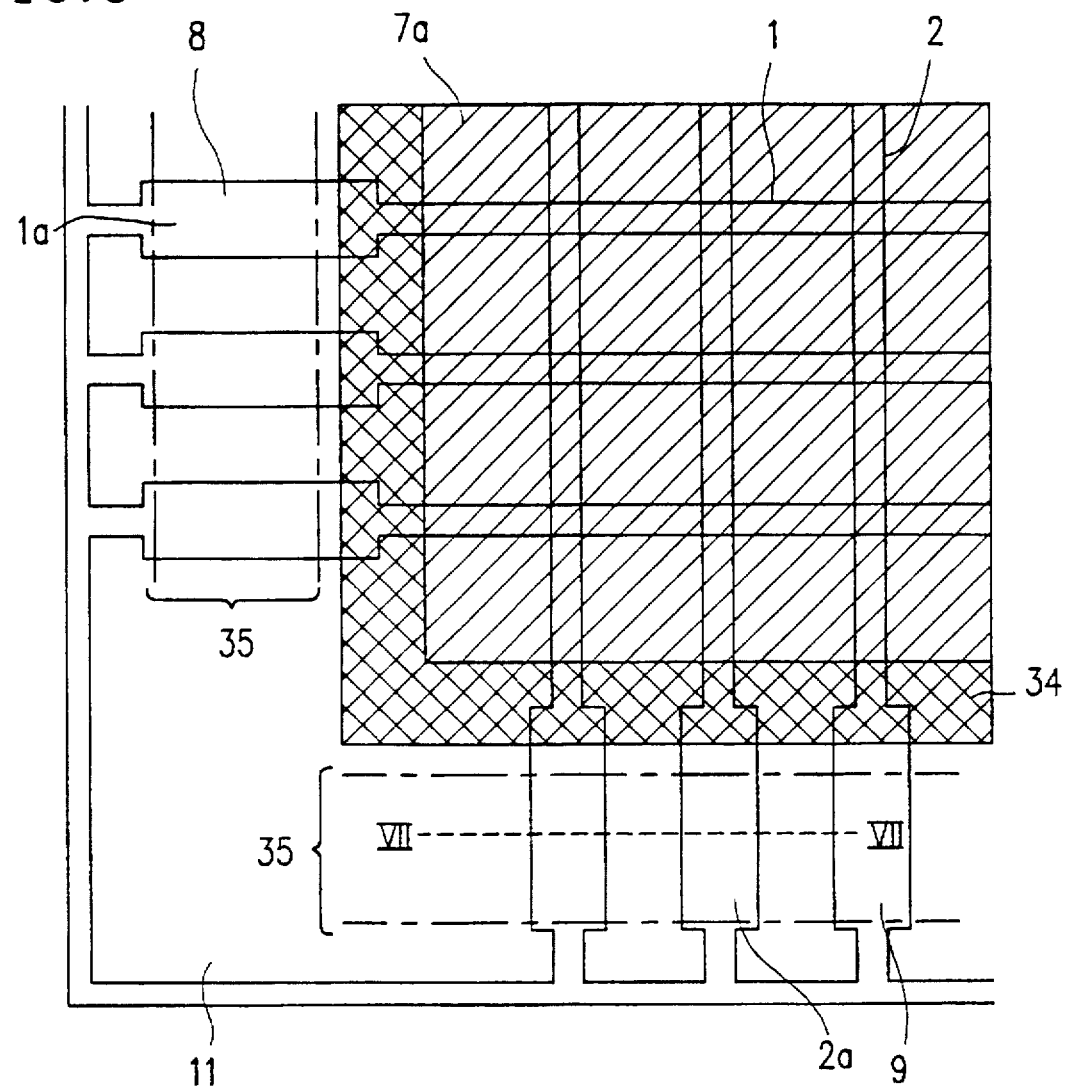
FIG. 6 is a plan view showing an active matrix substrate.
Figure 7A:
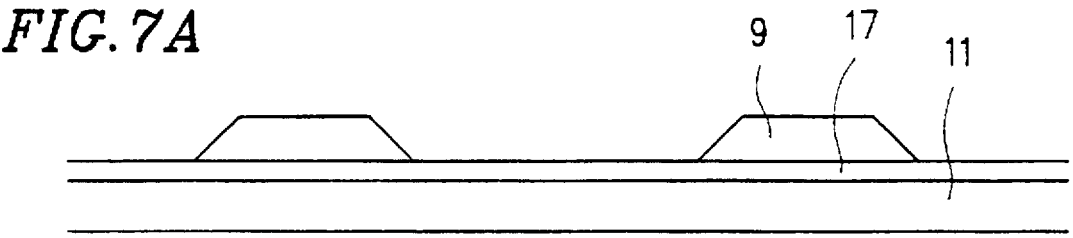
FIGS. 7A to 7D are illustrative views taken along line VII—VII in FIG. 6, showing a manufacturing process of the active matrix substrate.
Figure 7B:
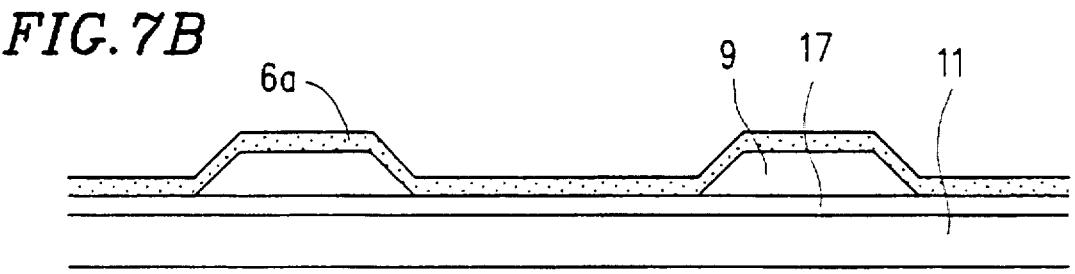
Figure 7C:
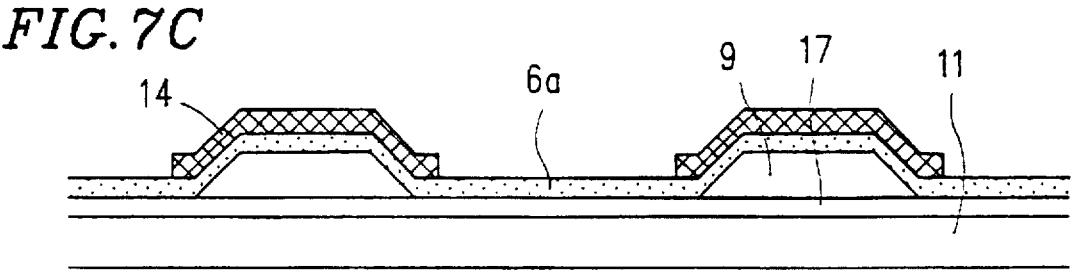
Figure 7D:
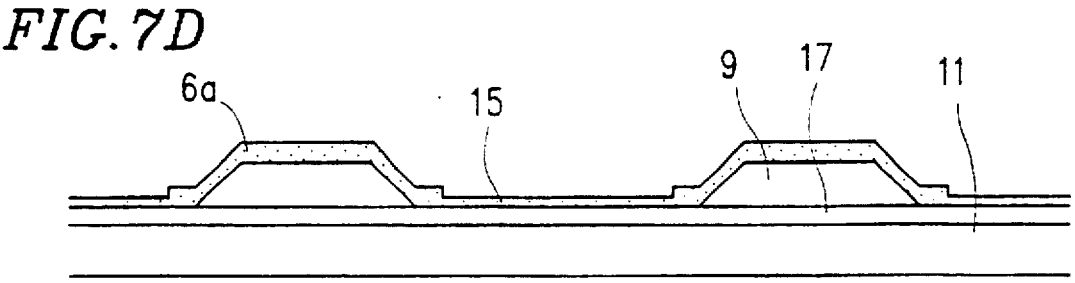

A connecting electrode 4 is formed so as to be electrically connected to the drain electrode of each TFT 3 (see FIGS. 5A and 5B). An organic interlayer insulating film 16 (described later) is formed so as to cover the gate line 1, the source line 2, the TFT 3 and the connecting electrode 4. A pixel electrode 6 made of an ITO film is electrically connected to the connecting electrode 4 via a contact hole 5 through the interlayer insulating film 16. The pixel electrodes 6 form a matrix on the interlayer insulating film 16. The region where the pixel electrodes 6 are formed defines a display region.

The above-described interlayer insulating film 16 includes a thin organic film main pattern 7 and thin organic film protrusions 10. The thin organic film main pattern 7 is formed over the display region, a portion of each broadened portion 1a for a gate line terminal 8 and a portion of each broadened portion 2a for a source line terminal 9. Each thin organic film protrusion 10 defines a portion outwardly extending from the thin organic film main pattern 7, the thin organic film protrusion 10 being positioned between adjoining gate line terminals 8 and/or between adjoining source line terminals 9. Alternatively, it is possible to form the thin organic film protrusions 10 as separate strips, each extending between adjoining gate line terminals 8 and/or between adjoining source line terminals 9 rather than as extensions of the thin organic film main pattern 7.

The manufacturing process of this active matrix substrate will be described with reference to FIGS. 1 and 2, FIG. 2 showing the cross-sectional view taken along line II—II in FIG. 1.

Figure 2A:
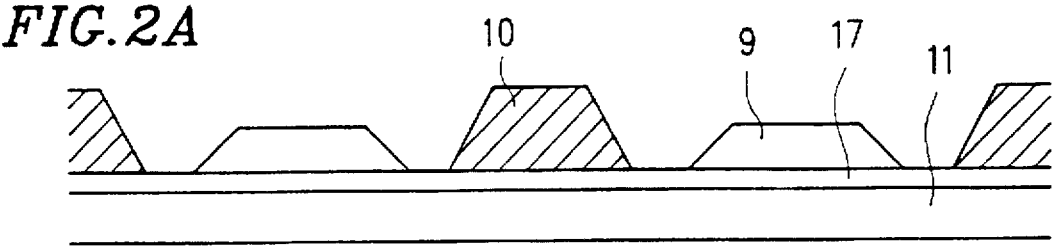
FIGS. 2A to 2D are cross-sectional views taken along line II—II in FIG. 1 illustrating a manufacturing process of the active matrix substrate according to an example of the present invention.

First, as shown in FIG. 2A, the gate electrodes, the broadened portions 1a and the gate lines 1 are formed on the inorganic insulating film 17, which is formed on a transparent substrate 11. A gate insulating film (not shown) is formed over the gate electrodes, the broadened portions 1a and the gate lines 1 and TFTs are formed thereon. Then, the source lines 2 to be connected to the source electrodes of the TFTs, the broadened portion 2a for the source line terminals 9, and the connecting electrodes to be connected to the drain electrodes of the TFTs are formed. Thereafter, an interlayer insulating film (i.e., thin organic film main pattern 7) is formed so as to cover the display region (including the gate line 1, the source line 2, the TFT and the connecting line) while simultaneously forming protrusions of interlayer insulating film (i.e., thin organic film protrusions 10) between adjoining gate line terminals 8, and between adjoining source line terminals 9.

Figure 2B:
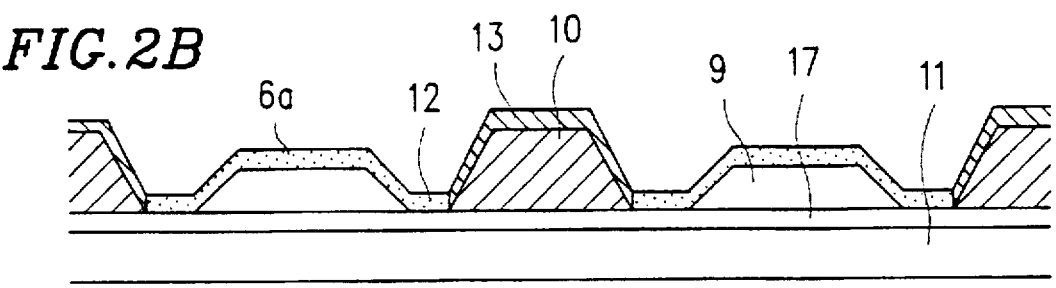

Then, as shown in FIG. 2B, an ITO film 6a to become pixel electrodes is formed on substantially the entire surface of the above-described substrate. An ITO film 12 formed on the inorganic insulating film 17 has a relatively slow etching rate and an ITO film 13 formed on the organic interlayer insulating film 16 (i.e., the thin organic film main pattern 7 and the thin organic film protrusions 10) has a relatively fast etching rate.

Figure 2C:
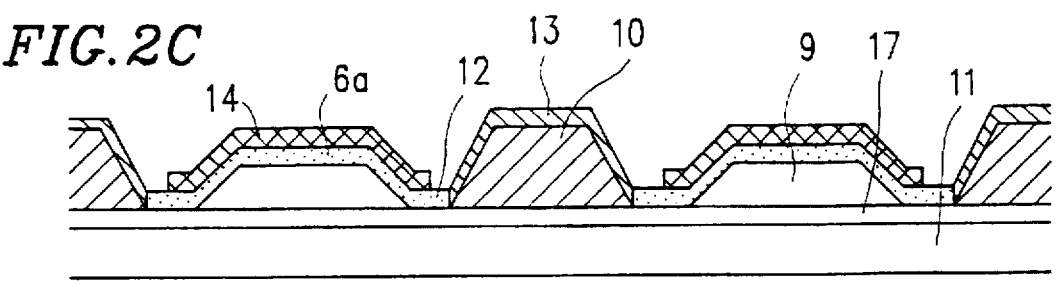
Figure 2D:
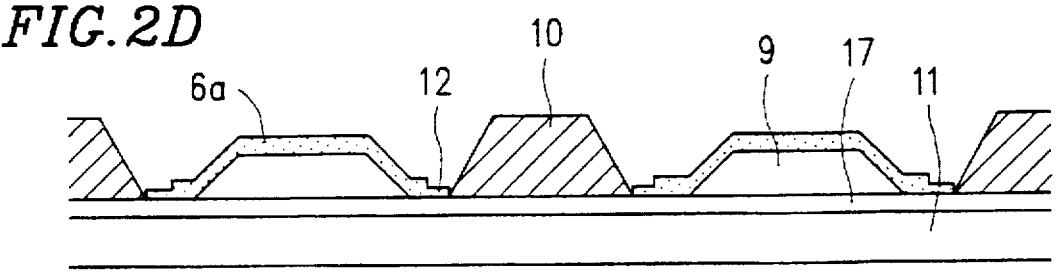

Subsequently, as shown in FIG. 2C, a photoresist 14 is formed by photolithography so as to cover the ITO film 12 on the terminals 9 as well as portions of the display region where pixel electrodes are to be formed.

Thereafter, the ITO film is etched using the photoresist 14 as a mask. As a result, the ITO film 13 on the thin organic film main pattern 7 formed on the display region is etched away simultaneously with the ITO film 13 on the thin organic film protrusions 10 formed in a mounting region 35. The above-described process similarly occurs in the vicinity of the source line terminals 8.

In accordance with the active matrix substrate of the present example, no remainder of the ITO film 13 is left between the gate line terminals 8, and/or between the source line terminals 9, even when the etching is performed for the relatively short etching time required for the ITO film 13 on the thin organic film main pattern 7. Thus, leakage between adjoining gate line terminals 8, and between adjoining source line terminals 9 is prevented. In addition, the ITO film can be formed/patterned through only one photopatterning process and one etching process.

Figure 3:
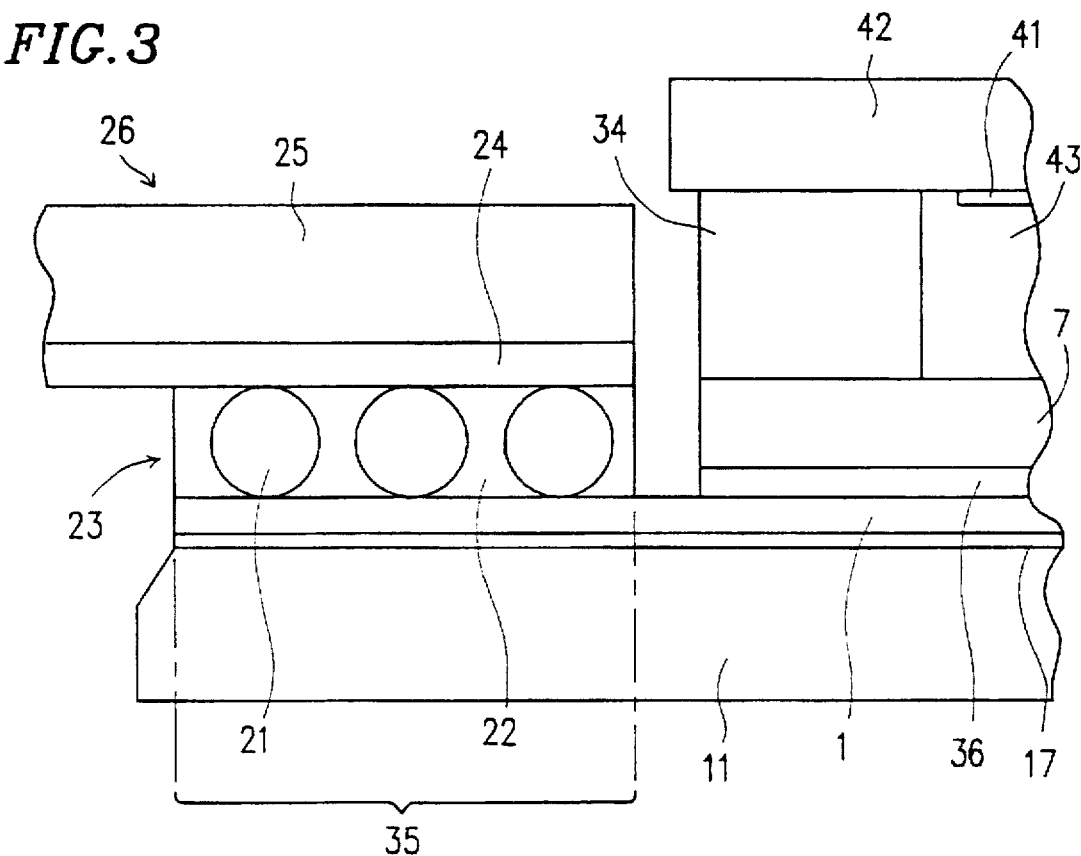
FIG. 3 is a cross-sectional view taken along line III—III in FIG. 1, partially showing a vicinity of terminals of an example of a liquid crystal display device according to the present invention.

As shown in FIG. 3, this active matrix substrate is attached to a counter substrate 42 at a sealing portion 34, the counter substrate 42 having a counter electrode 41 formed thereon. A liquid crystal layer 43 is interposed between the two substrates 11 and 42, thereby forming a liquid crystal display device. Reference numeral 36 indicates a gate insulating layer. In the periphery of the display region, the gate line terminals 8 and the source line terminals 9 are connected to a TAB (Tape Automated Bonding) 26 via an anisotropic conductive film 23 in the mounting region 35 around the sealing portion 34. The TAB 26 includes a base substrate 25 (of an external circuit) and terminals 24 formed of copper or the like. The anisotropic conductive film 23 is a film formed by mixing plastic beads or metal particles 21 in an insulative resin 22. The mounting region 35 typically extends about 3 to 5 mm. Once the display device is completed, a short ring 31, which is connected to the terminals 8 and 9 as shown in FIG. 1, is removed along a chamfering line 32.

Although the thin organic film protrusions 10 are formed simultaneously with the thin organic film main pattern 7 in the above example, the thin organic film protrusions 10 may be separately formed by themselves. The thin organic film main pattern 7 and the thin organic film protrusions 10 function as an interlayer insulating film, an etching stopper layer, or the like to be formed under the pixel electrodes. Thus, it is more preferable to form the thin organic film main pattern 7 (if at all) and the thin organic film protrusions 10 at the same time to simplify the manufacturing process.

Figure 4:
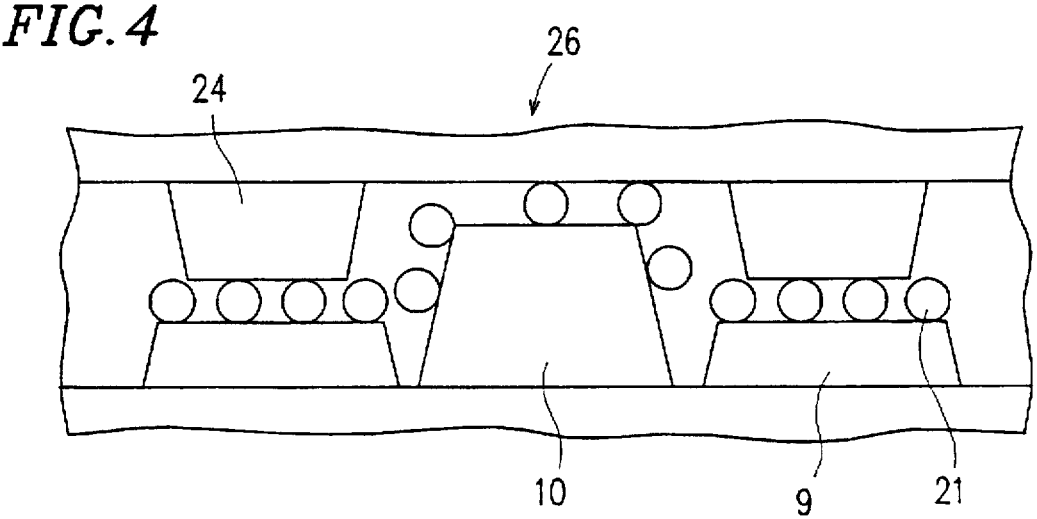
FIG. 4 is a partial schematic view showing an electrical connection between terminals of an external circuit and terminals of the active matrix substrate of the liquid crystal display device according to the present invention.

In the above case, the thickness of the thin organic film protrusions 10 relative to that of the terminals 8 and 9 varies depending on the specific insulating film to be used. When the thin organic film protrusion 10 is thicker than the terminals 8 and 9 as shown in FIG. 4, the leakage between the terminals can be prevented more effectively because the conductive particles 21 in the anisotropic conductive film 23 are dispersed over a larger area between the terminals than in the case where the thin organic film protrusion 10 is thinner than the terminals 8 and 9.

As an organic material for the above-described thin organic film main pattern 7 and thin organic film protrusions 10, a photosensitive acrylic resin, a fluorine-containing resin having permeability, or the like can be used.

In the above-described example, TFTs having an inverted staggered structure are used as the switching elements. Alternatively, the present invention can be similarly applied to the case where TFTs of a staggered structure, TFTs of a coplaner structure, MIM elements, or the like are used as the switching elements.

Furthermore, in the above example, a TAB circuit is described to be externally connected to the above terminals 8 and 9. Alternatively, the present invention can be applied to the case where an FPC (Flexible Printed Circuit), an IC chip (COG: Chip On Glass), or the like is used.

The present invention is not limited to a liquid crystal display device typically including liquid crystal (as a display medium) interposed between an active matrix substrate and an opposing substrate. The present invention can alternatively be applied to a display device employing an electrochromic material, an electroluminescent material, a plasma, or the like.

As is evident from the above description, according to the present invention, since no ITO film remains between the terminals when the pixel electrodes have been patterned, any disadvantageous leak between the terminals can be prevented. Accordingly, it is not necessary to perform a second photopatterning process or a second etching process to remove the remaining ITO film between the terminals. Consequently, the manufacturing process can be simplified and thus the production cost of the active matrix substrate can be reduced. Moreover, the defective leakage between the terminals can be further reduced by dispersing the particles contained in a conductive film used to connect the active matrix substrate to an external circuit. Thus, by using this active matrix substrate, a display device having excellent display qualities can be obtained at low cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix substrate comprising:

a substrate;

a plurality of switching elements and a plurality of pixel electrodes formed in a matrix on the substrate;

scanning lines for supplying a scanning signal and for controlling the plurality of switching elements;

signal lines for supplying a data signal to the plurality of switching elements formed so as to cross each other;

outwardly extending terminals electrically connected to either each scanning line or each signal line, the terminals being connectable to external terminals; and a composite interlayer structure comprising an organic insulating film covering the scanning lines, the signal lines and the switching elements and an inner portion of all the terminals, and additionally having elongated outwardly extending protrusions located adjacent each of the terminals.

2. An active matrix substrate according to claim 1, wherein the plurality of pixel electrodes are formed on the interlayer insulating film and are connected to the respective switching elements via contact holes formed in the interlayer insulating layer.

3. An active matrix substrate according to claim 2 wherein the pixel electrodes include peripheral edges which overlap the scanning lines and the signal lines.

4. An active matrix substrate according to claim 1, wherein a thickness of the organic film formed between adjacent terminals is larger than that of the terminals.

5. An active matrix substrate according to claim 1, wherein the organic film is formed of a positive-type photosensitive resin.

6. A display device using an active matrix substrate according to claim 1 as one of a pair of substrates interposing a display medium therebetween.

7. A display device according to claim 6 wherein the other substrate of the pair of substrates comprises a counter substrate sealed, except for the protrusion extending adjacent the terminals, to the one substrate at a peripheral edge of the organic insulating film.

8. An active matrix substrate according to claim 1 and additionally including an inorganic insulating film formed on the substrate and wherein the switching elements and pixel electrodes are formed on the inorganic insulating film.

9. An active matrix substrate according to claim 1 wherein the outwardly extending terminals are rectangular and have elongated side edges.

10. An active matrix substrate according to claim 1 wherein the outwardly extending terminals are rectangular and have widths greater than the widths of the scanning lines and the signal lines.

11. An active matrix substrate according to claim 1 wherein the outwardly extending terminals comprise elongated rectangular terminals having widths greater than the widths of the scanning lines and the signal lines.

12. A display device according to claim 1 wherein said protrusions extend outwardly past the terminals.

13. An active matrix substrate comprising:

a substrate;

a plurality of switching elements and a plurality of pixel electrodes formed in a matrix on the substrate;

scanning lines for supplying a scanning signal and for controlling the plurality of switching elements;

signal lines for supplying a data signal to the plurality of switching elements formed so as to cross each other;

outwardly extending terminals connected to either each scanning line or each signal line and having elongated side edges and widths greater than the widths of the scanning lines and the signal lines, the terminals being connectable to external terminals; and a composite interlayer structure comprising an organic insulating film covering the scanning lines, the signal lines and the switching elements and an inner portion of all the terminals, and additionally having elongated outwardly extending protrusions located adjacent each of the side edges of the terminals.

14. An active matrix substrate comprising:

a substrate including an inorganic insulating film formed thereon;

a plurality of switching elements and a plurality of pixel electrodes formed in a matrix on the inorganic insulating film;

scanning lines for supplying a scanning signal and for controlling the plurality of switching elements;

signal lines for supplying a data signal to the plurality of switching elements formed so as to cross each other;

outwardly extending terminals connected to either each scanning line or each signal line and having elongated side edges and widths greater than the widths of the scanning lines and the signal lines, the terminals being connectable to external terminals; and a composite interlayer structure comprising an organic insulating film covering the scanning lines, the signal lines and the switching elements and an inner portion of all the terminals, and additionally having elongated outwardly extending protrusions located adjacent each of the side edges of the terminals.

* * * * *